Sept. 25, 1956 J. J. JACOBS ET AL 2,764,456

SCREENING ARRANGEMENT FOR FLUID LUBRICATED BEARINGS

Filed June 2, 1955 2 Sheets-Sheet 1

Inventors
Joseph J. Jacobs
Richard M. Higgins
by Robert B. Benson
Attorney

Sept. 25, 1956  J. J. JACOBS ET AL  2,764,456
SCREENING ARRANGEMENT FOR FLUID LUBRICATED BEARINGS
Filed June 2, 1955  2 Sheets-Sheet 2

Inventors
Joseph J. Jacobs
Richard M. Higgins
by Robert B. Benson
Attorney

2,764,456
Patented Sept. 25, 1956

---

2,764,456

SCREENING ARRANGEMENT FOR FLUID LUBRICATED BEARINGS

Joseph J. Jacobs and Richard M. Higgins, Milwaukee, Wis., assignors to Allis-Chalmers Manufacturing Company, Milwaukee, Wis.

Application June 2, 1955, Serial No. 512,616

12 Claims. (Cl. 308—78)

---

This invention relates generally to dynamic means for screening lubricant before it enters the bearings being lubricated. More specifically the invention relates to dynamic and self-cleaning means in fluid conveying devices such as self-lubricated centrifugal pumps for screening the lubricant portion of the fluid being conveyed to prevent particles greater than a predetermined size from entering the bearings.

The screening device of this invention is applicable to any system of bearings that are lubricated by a fluid, but has special application to fluid conveying devices such as self-lubricated centrifugal pumps which derive their bearing lubricant from the fluid being conveyed.

In such a fluid conveying device having journal bearings, oversize particles in the lubricant may damage the bearings, either by marring the bearing surfaces directly or by plugging the hydraulic conduits to the bearing, thereby depriving the bearing of its lubricant.

In fluid conveying devices equipped with fluid bearings in contradistinction to journal bearings, oversize particles in the lubricant may render the fluid bearing inoperative either by plugging the several hydraulic conduits to the bearing to cause pressure unbalance between bearing sections, or by eroding the lips of the bearing to cause undesired fluid flow between adjacent sections.

A variety of static filters have been used in the prior art to clear foreign particles from the lubricant before it enters the bearing. In static filters the fluid containing the foreign particles passes directly through a screen which eventually becomes clogged with foreign particles that cannot pass through the filter. Hence the screens have to be cleaned or replaced periodically.

This invention contemplates screening lubricant through a very small clearance defined between a rotating member and a stationary member. The clearance is positioned in the channel through which the lubricant flows on its way to the bearing. Particles small enough to pass through the clearance will not harm the bearing and particles larger than the clearance will be prevented from entering the bearing. Such a structure eliminates the need for a static screen in the channel through which the lubricant flows into the bearing and provides a filter which is self-cleaning.

In this invention, as illustrated in a self-lubricated centrifugal pump, the shaft of the pump is positioned adjacent to a stationary member to form the desired clearance. The shaft rotates relatively to the stationary member to grind foreign particles in the lubricant that get caught between the rotating member and the stationary member to a size small enough to pass through the clearance. There is less chance of clogging in the dynamic screening device of this invention than in the static filter of the prior art because the grinding action in the dynamic screening device has a self-cleaning effect on the clearance. Because of the self-cleaning effect of the grinding action in the screening device of this invention, the screening device does not have to be cleaned or replaced as often as the filters used in the art today. Therefore a centrifugal pump using the screening device of this invention requires less maintenance than centrifugal pumps using the static filters known to the art today.

It is therefore an object of this invention to provide a lubricant screening device that requires less maintenance than the lubricant filters used in the art today.

Another object of this invention is to provide a lubricant screening device for use with fluid conveying devices such as a self-lubricated centrifugal pump that eliminates the need for separate static lubricant filters.

Another object of this invention is to provide a screening device for use with bearings in which the fluid lubricant entering the bearing is screened between relatively moving parts of the pump.

Another object of this invention is to provide a lubricant screening device for use with a fluid bearing in a fluid conveying device such as a self-lubricating centifugal pump that utilizes the relative motion of parts of the fluid conveying device to grind oversized foreign particles in the portion of the fluid being used as a bearing lubricant to a size that is less than a predetermined size as the fluid flows into the bearing.

Another object of this invention is to provide a self-cleaning screening device for use with bearings such as a fluid bearing.

Objects and advantages other than those set forth above will be apparent from the following description when read in conjunction with the drawing, in which.

Figure 1:
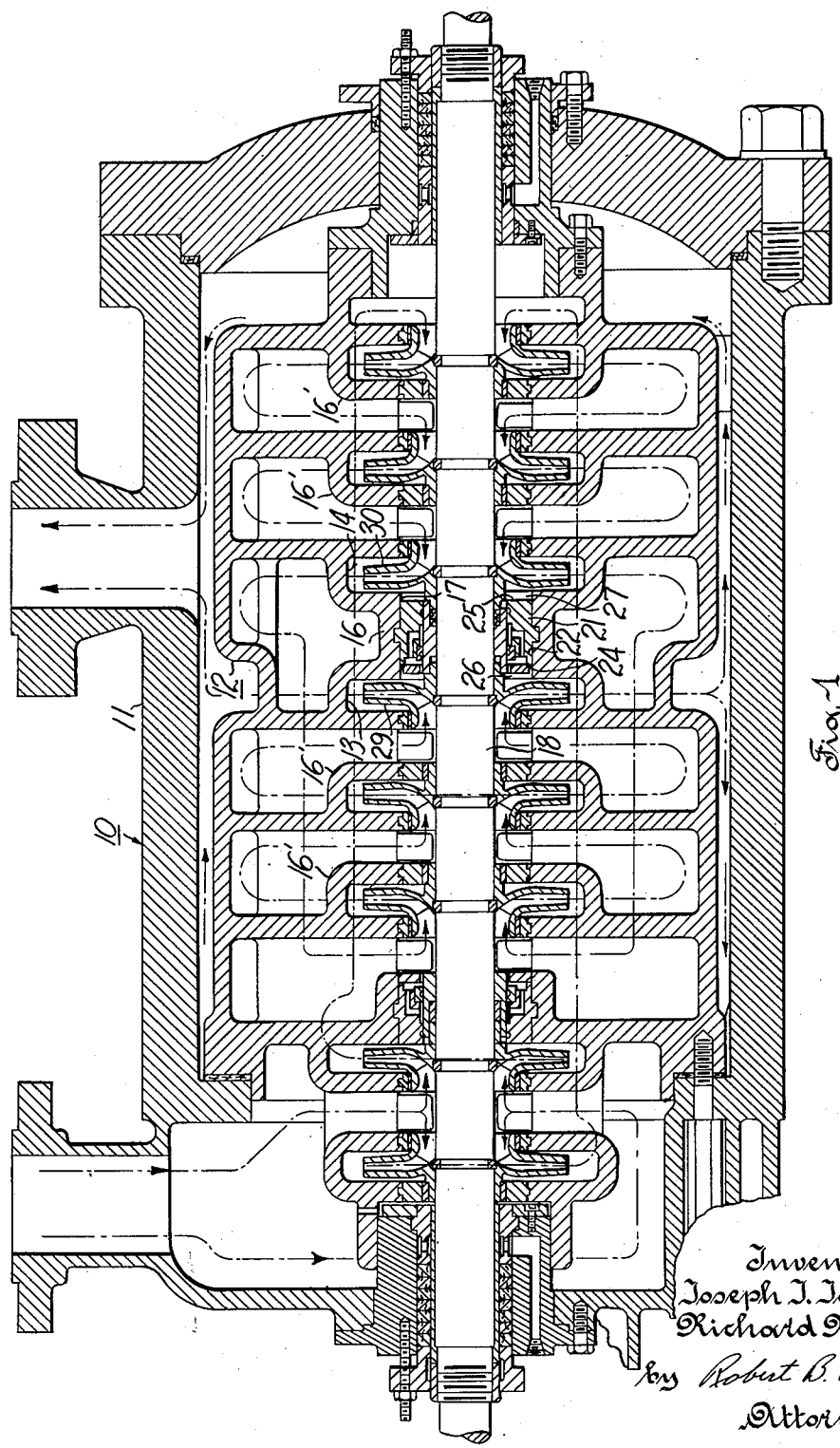
Fig. 1 is a longitudinal section through a self-lubricated centrifugal pump embodying the invention.

Although the invention is applicable to any system of bearings lubricated by a fluid in which the lubricant is supplied to the bearing under pressure; the invention is illustrated, as shown in the drawings, in a dynamic screening means for a self-lubricated centrifugal pump.

The pump 10 of Fig. 1 includes an outer casing 11 and an inner casing 12. The inner casing 12 defines a series of volutes, such as 13, 14 separated by a partition, such as 16. Other partitions 16' separate other adjacent volutes disposed on either side of volutes 13, 14. Each partition defines a passageway such as the passageway 17 in partition 16 for receiving the shaft 18. Bearing means, shown as fluid bearing 21, are mounted on the wall 22 of the passageway 17 for supporting the shaft 18. The radial faces 24, 25 of the bearing 21 cooperate with the passageway 17 and the volutes 13, 14 to form fluid confining chambers 26 and 27, respectively. The outer periphery of the bearing 21 cooperates with the wall 22 of the passageway 17 to form a fluidtight seal between the chambers 26 and 27.

The shaft 18 extends through the passageways in all the partitions 16, 16' and is rotatably mounted in the fluid bearing 21. Impellers are mounted on the shaft 18 and positioned within the volutes. Impellers 29 and 30 are positioned within volutes 13 and 14, respectively.

Figure 3:
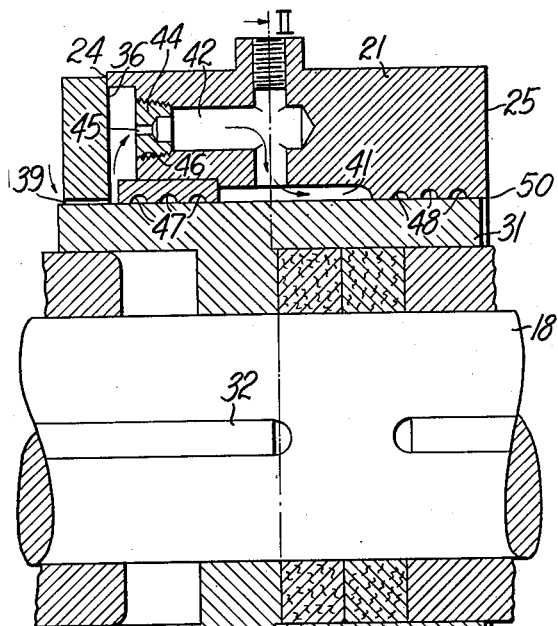
Fig. 3 is a section taken along the line III—III of Fig. 2, showing the dynamic screening device of the invention hydraulically connected to the bearing of the pump of Fig. 1.

As shown in Fig. 3, the shaft 18 carries a ring 31 which is supported by the bearing 21. The ring 31 encircles shaft 18 between the shaft 18 and the bearing 21 and has a T-shaped cross section. The outer surface of the ring 31 which in section forms the top of the T, rides on the bearing surface of the fluid bearing 21, and the inner surface of the ring 31 grips the shaft 18 in nonrotatable relation thereto. A key 32 seated in keyways in the ring 31 and in the shaft 18 transmits torque from the shaft 18 to the ring 31 so that the ring 31 is rotatable with the shaft 18.

Figure 4:
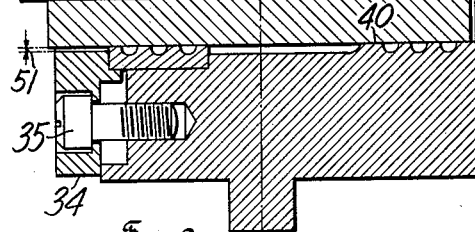
Fig. 4 is an end view of the disk of the dynamic screening device shown in Fig. 3.
Figure 4:
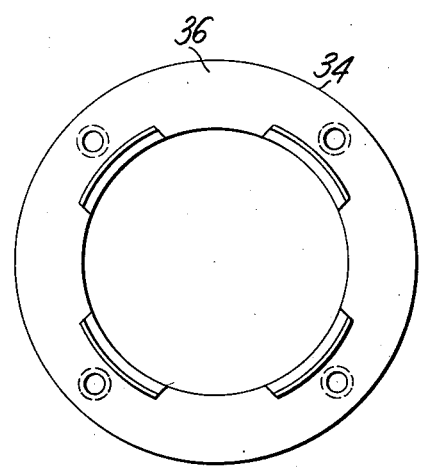

An element shown in Figs. 3 and 4 as an annular disk 34 is positioned in the chamber 26, encircles the ring 31, and is mounted on the axial face 24 of the bearing 21 by screws 35, only one of which is shown in Fig. 3. An axial face 36 of the disk abuts in fluidtight relation an outer portion of the axial face 24 of the bearing 21 thereby forming a fluidtight seal between the disk 34 and the outer portion of bearing 21. The outer surface of the rotatable ring 31 cooperates with the inner surface of the stationary disk 34 to form particle screening means including an annular space or clearance 39 between the revolving ring 31 and the stationary disk 34.

In a system of bearings that are not self-lubricated the bearing would be connected to a source of lubricant fluid under pressure through the screening clearance. The particle screening means comprising the clearance would be formed by the rotating member mounted in the bearing and a stationary member positioned between the source of fluid and the intake of the bearing.

Figure 2:
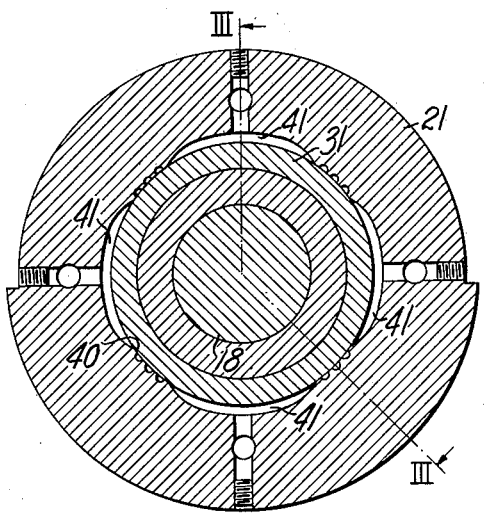
Fig. 2 is a transverse section taken along lines II—II of Fig. 3 showing the fluid bearing of the pump of Fig. 1.

The bearing 21 may be any suitable bearing such as a journal bearing but as shown in Figs. 2 and 3 is a fluid pressure bearing and has a bore 40. A plurality of fluid confining pockets 41 are circumferentially spaced about the bearing 21 and open on bore 40. The pockets 41 face the outer surface of the ring 31. Channels 42, only one of which is shown in Fig. 3, are in the walls of the bearing 21 to hydraulically connect the pockets 41 and the chamber 26 for conducting fluid as it flows through the bearing 21 into the pockets 41.

Orifice plugs 44, only one of which is shown in Fig. 3, each having an intake 45, are threaded into the openings 46 at the end of each of the channels 42 adjacent the fluid confining chamber 26 to regulate the flow of fluid through the bearing 21. Labyrinths 47 and 48 are disposed in the wall of the bore 40 on either side of the pockets 41 and cooperate with the ring 31 for further regulating the rate of flow of the fluid passing along the bearing surface between the ring 31 and the bearing 21.

The labyrinths 48 adjacent the chamber 27 cooperate with the ring 31 to form an exit 50 for fluid flowing out of the pockets 41 into the chamber 27.

The cross sectional area of the intakes 45 is determined according to the empirical formula—

$$A_i = A_e C_e / N R C_i$$

in which $A_i$ = cross sectional area of each intake,
$A_e$ = cross sectional area of the exit,
$C_i$ = orifice coefficient of the intake,
$C_e$ = orifice coefficient of the exit,
$R$ = .3 to 8, and
$N$ = number of intakes.

The constant R varies from .3 to 8 for the best performance of the fluid bearing.

The size of the screening clearance 39 is small enough to prevent oversize foreign particles from entering the bearing 21 yet large enough to permit sufficient fluid to enter the bearing 21 for lubricating it. Accordingly, the radial width 51 of the clearance 39 is less than the smallest dimension of the intakes 45 and the cross sectional area of the clearance 39 is greater than the cross sectional area of the intakes 45.

When the self-lubricated centrifugal pump 10 shown in Fig. 1 is operating the fluid being pumped flows into the volute 13 where it is acted on by the impeller 29 and discharged into chamber 26 under a higher pressure than the fluid in chamber 27. The bearing 21 is positioned between the chambers 26 and 27 so that there is a pressure differential across the bearing 21 which is utilized to cause fluid to flow from the high pressure region in chamber 26 through the bearing 21 into the lower pressure region in chamber 27. In other systems of bearings in which impellers are not used, a source of fluid under pressure is utilized to cause the pressure differential across the bearing.

In operation the fluid being used as the lubricant in a self-lubricated centrifugal pump flows, as indicated by the arrows in Figs. 1 and 3, from the high pressure region in chamber 26 through the screening clearance 39 through the intakes 45 into the channels 42, thence into the pockets 41 where it passes through labyrinths 48 and then into the chamber 27 where the fluid is under pressure. Some of the fluid bypasses the channels 42 and goes through the labyrinths 47 into the pockets 41.

As the fluid passes through the clearance 39 the foreign particles in the fluid larger than the clearance 39 are either ground to a size smaller than the clearance 39 by the action of the revolving ring 31 and the stationary disk 34 or are prevented altogether from passing through the clearance 39.

Thus the disk 34 and ring 31 comprise a dynamic screening means for straining particles from the bearing fluid.

If a foreign particle in the fluid has a portion small enough to enter the clearance 39 the action of the stationary disk 34 and the revolving ring 31 will tend to break or grind that portion of the particle away from the main body. Hence the small portion that is broken off will pass through the clearance and the remainder of the particle will be smaller than the original particle and more likely to pass through the clearance. The particles that are too large to even partially enter the clearance 39 will be prevented from passing into the clearance 39. Those particles which are unable to pass through the clearance 39 because of their size will be continually forced against the ring 31 and disk 34 by the force of the fluid under pressure. The rotating ring 31 will tend to move the foreign particle being forced against the disk 34 in a circular motion. As the particles move in response to the motion of the ring 31 they will rub against the stationary disk 34 and will be ground to a smaller size.

Figure 5:
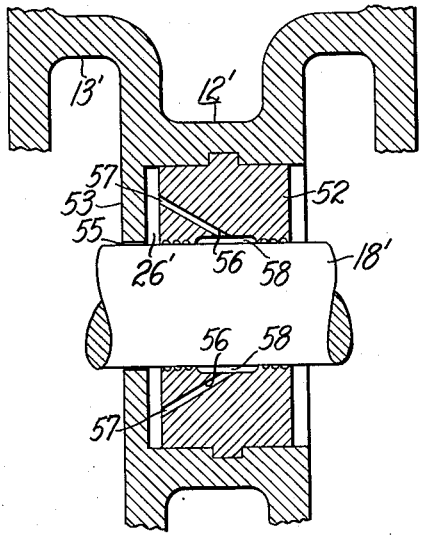
Fig. 5 is a section illustrating an alternative embodiment of the dynamic screening device of the invention.

Fig. 5 shows another embodiment of the lubricant screening device in a self-lubricated centrifugal pump. The shaft 18', as shown in Fig. 5, is supported directly by the bearing 52. A projection 53 of the inner casing 12' extends into the chamber 26' between the volute 13' and the bearing 52. The projection 53 encircles the rotating shaft 18' to form therebetween a particle screening means including the clearance 55. The bearing 52 of Fig. 5 defines channels 56, only two of which are shown in Fig. 5, having intakes 57 for conducting fluid from the chamber 26' to the pockets 58. The size of the intakes 57 are determined according to the same formula used to determine the size of the intakes 45 in the first embodiment.

The embodiment shown in Fig. 5 operates in the same way as the first embodiment except that the lubricant flows through the clearance 55 formed by a projection 53 of the inner casing 12' and the shaft 18' instead of a clearance 39 formed by the ring 31 mounted on the shaft 18 and the disk 34 interposed between the inner casing 12 and the ring 31 as shown in the first embodiment.

The surfaces of the disk and the shaft or ring mounted on the shaft which do the grinding are made of sufficiently hard material so that the grinding does not cause enough wear on the parts to materially increase the clearance.

Although but two embodiments have been illustrated and described it will be apparent to those skilled in the art that various changes and modifications may be made therein without departing from the spirit of the invention or from the scope of the appended claims.

It is claimed and desired to secure by Letters Patent:
1. In combination, bearing means, a shaft rotatably mounted in said bearing means, said bearing means defining intakes for admitting fluid into said bearing means, said bearing means cooperating with said shaft to form an exit for conducting fluid out of said bearing means, a nonrotatable element surrounding said shaft and positioned adjacent said intakes, said element cooperating with said rotatable shaft to form a particle screening means, said intakes being hydraulically connected through said particle screening means to a source of fluid under pressure, said particle screening means providing a fluid clearance having a radial width less than the smallest dimension of said intakes and a cross sectional area greater than the sum of said cross sectional areas of said intakes, whereby foreign particles in the fluid larger than said intakes are screened from the fluid as it passes from said source into said bearing through said clearance and foreign particles arrested in said clearance are reduced to a size freely passable through said intakes to effect a continuous self-cleaning of said screening means.

2. In combination, bearing means, a shaft rotatably mounted in said bearing means, said bearing means defining intakes for admitting fluid into said bearing means, said bearing means cooperating with said shaft to form an exit for conducting fluid out of said bearing means, the cross sectional area of said intakes being determined by the formula—

$$A_i = A_e C_e / NRC_i$$

in which $A_i$ = cross sectional area of each intake,
$A_e$ = cross sectional area of the exit,
$C_i$ = orifice coefficient of the intake,
$C_e$ = orifice coefficient of the exit,
$R$ = .3 to 8, and
$N$ = number of intakes, a nonrotatable element surrounding said shaft and positioned adjacent said intakes, said element cooperating with said rotatable shaft to form a particle screening means, said intakes being hydraulically connected through said particle screening means to a source of fluid under pressure, said particle screening means providing a fluid clearance having a radial width less than the smallest dimension of said intakes and a cross sectional area greater than the sum of said cross sectional areas of said intakes, whereby foreign particles in the fluid larger than said intakes are screened from the fluid as it passes from said source into said bearing through said clearance and foreign particles arrested in said clearance are reduced to a size freely passable through said intakes to effect a continuous self-cleaning of said screening means.

3. In combination, fluid bearing means, a shaft rotatably mounted in said bearing means, said bearing means defining intakes for admitting fluid into said bearing means, said bearing means cooperating with said shaft to form an exit for conducting fluid out of said bearing means, the cross sectional area of said intakes being determined by the formula—

$$A_i = A_e C_e / NRC_i$$

in which $A_i$ = cross sectional area of each intake,
$A_e$ = cross sectional area of the exit,
$C_i$ = orifice coefficient of the intake,
$C_e$ = orifice coefficient of the exit,
$R$ = .3 to 8, and
$N$ = number of intakes, a nonrotatable element surrounding said shaft and positioned adjacent said intakes, said element cooperating with said rotatable shaft to form a particle screening means, said intakes being hydraulically connected through said particle screening means to a source of fluid under pressure, said particle screening means providing a fluid clearance having a radial width less than the smallest dimension of said intakes and a cross sectional area greater than the sum of said cross sectional areas of said intakes, whereby foreign particles in the fluid larger than said intakes are screened from the fluid as it passes from said source into said bearing through said clearance and foreign particles arrested in said clearance are reduced to a size freely passable through said intakes to effect a continuous self-cleaning of said screening means.

4. In combination, fluid bearing means, a shaft rotatably mounted in said bearing means, said bearing means defining intakes for admitting fluid into said bearing means, said bearing means cooperating with said shaft to form an exit for conducting fluid out of said bearing means, the cross sectional area of said intakes being determined by the formula—

$$A_i = A_e C_e / NRC_i$$

in which $A_i$ = cross sectional area of each intake,
$A_e$ = cross sectional area of the exit,
$C_i$ = orifice coefficient of the intake,
$C_e$ = orifice coefficient of the exit,
$R$ = .3 to 8, and
$N$ = number of intakes, a nonrotatable annular disk surrounding said shaft and positioned adjacent said intakes, said disk cooperating with said shaft to form a particle screening means, said intakes being connected through said particle screening means to a source of fluid under pressure, said particle screening means providing a fluid clearance having a radial width less than the smallest dimension of said intakes and a cross sectional area greater than the sum of said cross sectional areas of said intakes, whereby foreign particles in the fluid larger than said intakes are screened from the fluid as it passes from said source into said bearing through said clearance and foreign particles arrested in said clearance are reduced to a size freely passable through said intakes to effect a continuous self-cleaning of said screening means.

5. In combination, fluid bearing means, said bearing means having a series of circumferentially spaced fluid confining pockets, a shaft rotatably mounted in said bearing means, said bearing means defining intakes for admitting fluid into said pockets, said bearing means cooperating with said shaft to form an exit for conducting fluid out of said pockets, the cross sectional area of said intakes being determined by the formula—

$$A_i = A_e C_e / NRC_i$$

in which $A_i$ = cross sectional area of each intake,
$A_e$ = cross sectional area of the exit,
$C_i$ = orifice coefficient of the intake,
$C_e$ = orifice coefficient of the exit,
$R$ = .3 to 8, and
$N$ = number of intakes, a nonrotatable annular disk surrounding said shaft and positioned adjacent said intakes, said disk cooperating with said shaft to form a particle screening means, said intakes being connected through said particle screening means to a source of fluid under pressure, said particle screening means providing a fluid clearance having a radial width less than the smallest dimension of said intakes and a cross sectional area greater than the sum of said cross sectional areas of said intakes, whereby foreign particles in the fluid larger than said intakes are screened from the fluid as it passes from said source into said bearing through said clearance and foreign particles arrested in said clearance are reduced to a size freely passable through said intakes to effect a continuous self-cleaning of said screening means.

6. A fluid conveying device comprising in combination a fluid confining casing, a partition in said casing for providing in said casing two adjacent fluid confining chambers, said partition defining a passageway between said chambers, fluid bearing means mounted in said passageway, a shaft rotatably mounted in said bearing means, a source of fluid under pressure connected to one of said chambers for causing a pressure differential between said chambers, said bearing means having a series of circumferentially spaced fluid confining pockets adjacent said shaft, said bearing means defining intakes for connecting said pockets to the chamber under the higher pressure, said bearing means cooperating with said shaft to form an exit for connecting said pockets to said chamber under the lower pressure, the cross sectional area of each of said intakes being determined by the formula—

$$A_i = A_e C_e / NRC_i$$

in which $A_i$ = cross sectional area of each intake,
$A_e$ = cross sectional area of the exit,
$C_i$ = orifice coefficient of the intake,
$C_e$ = orifice coefficient of the exit,
$R$ = .3 to 8, and
$N$ = number of intakes, a portion of said casing projecting into the said one chamber connected to said source of fluid and positioned between the source of the fluid and said bearing, said portion surrounding said shaft to form with said shaft particle screening means, said particle screening means providing a fluid clearance having a radial width less than the smallest dimension of said intakes and a cross sectional area greater than the sum of said cross sectional areas of said intakes, whereby foreign particles in the fluid larger than said intakes are screened from the fluid as it passes from said source into said bearing through said clearance and foreign particles arrested in said clearance are reduced to a size freely passable through said intakes to effect a continuous self-cleaning of said screening means.

7. A fluid conveying device comprising in combination a fluid confining casing, a partition in said casing for providing in said casing two adjacent fluid confining chambers, said partition defining a passageway between said chambers, fluid bearing means mounted in said passageway, a shaft rotatably mounted in said bearing means, a source of fluid under pressure connected to one of said chambers for causing a pressure differential between said chambers, said bearing means having a series of circumferentially spaced fluid confining pockets adjacent said shaft, said bearing means defining intakes for connecting said pockets to said chamber under the higher pressure, said bearing means cooperating with said shaft to form an exit for connecting said pockets to said chamber under the lower pressure, the cross sectional area of each of said intakes being determined by the formula—

$$A_i = A_e C_e / NRC_i$$

in which $A_i$ = cross sectional area of each intake,
$A_e$ = cross sectional area of the exit,
$C_i$ = orifice coefficient of the intake,
$C_e$ = orifice coefficient of the exit,
$R$ = .3 to 8, and
$N$ = number of intakes, a nonrotatable annular disk surrounding said shaft and positioned in said chamber under the higher pressure between the source of the fluid and said bearing, said disk cooperating with said shaft to provide a particle screening means, said particle screening means providing a fluid clearance having a radial width less than the smallest dimension of said intakes and cross sectional area greater than the sum of said cross sectional areas of said intakes, whereby foreign particles in the fluid larger than said intakes are screened from the fluid as it passes from said source into said bearing through said clearance and foreign particles arrested in said clearance are reduced to a size freely passable through said intakes to effect a continuous self-cleaning of said screening means.

8. A fluid conveying device comprising in combination a fluid confining casing, a partition in said casing for providing in said casing two adjacent fluid confining chambers, said partition defining a passageway between said chambers, fluid bearing means mounted in said passageway, a shaft rotatably mounted in said bearing means, a source of fluid under pressure connected to one of said chambers for causing a pressure differential between said chambers, said bearing means having a series of circumferentially spaced fluid confining pockets adjacent said shaft, said bearing means defining intakes for connecting said pockets to said chamber under the higher pressure, said bearing means cooperating with said shaft to form an exit for connecting said pockets to said chamber under the lower pressure, a nonrotatable annular disk surrounding said shaft and positioned in said chamber under the higher pressure between the source of the fluid and said bearing, said disk cooperating with said shaft to provide a particle screening means, said particle screening means providing a fluid clearance having a radial width less than the smallest dimension of said intakes and cross sectional area greater than the sum of said cross sectional areas of said intakes, whereby foreign particles in the fluid larger than said intakes are screened from the fluid as it passes from said source into said bearing through said clearance and foreign particles arrested in said clearance are reduced to a size freely passable through said intakes to effect a continuous self-cleaning of said screening means.

9. A fluid conveying device comprising in combination a fluid confining casing, a partition in said casing for providing in said casing two adjacent fluid confining chambers, said partition defining a passageway between said chambers, bearing means mounted in said passageway, a shaft rotatably mounted in said bearing means, a source of fluid under pressure connected to one of said chambers for causing a pressure differential between said chambers, said bearing means having a series of circumferentially spaced fluid confining pockets adjacent said shaft, said bearing means defining intakes for connecting said pockets to said chamber under the higher pressure, said bearing means cooperating with said shaft to form an exit for connecting said pockets to said chamber under the lower pressure, the cross sectional area of each of said intakes being determined by the formula—

$$A_i = A_e C_e / NRC_i$$

in which $A_i$ = cross sectional area of each intake,
$A_e$ = cross sectional area of the exit,
$C_i$ = orifice coefficient of the intake,
$C_e$ = orifice coefficient of the exit,
$R$ = .3 to 8, and
$N$ = number of intakes, a nonrotatable annular element surrounding said shaft and positioned in said chamber under the higher pressure between the source of the fluid and said bearing, said element cooperating with said shaft to provide a particle screening means, said particle screening means providing a fluid clearance having a radial width less than the smallest dimension of said intakes and a cross sectional area greater than the sum of said cross sectional areas of said intakes, whereby foreign particles in the fluid larger than said intakes are screened from the fluid as it passes from said source into said bearing through said clearance and foreign particles arrested in said clearance are reduced to a size freely passable through said intakes to effect a continuous self-cleaning of said screening means.

10. A self-lubricating centrifugal pump comprising in combination, a fluid confining casing, a partition in said casing for providing in said casing two adjacent fluid confining chambers, said partition defining a passageway between said chambers, fluid bearing means mounted in said passageway, a shaft rotatably mounted in said bearing means, impeller means mounted on said shaft to impart a pressure to the fluid supplied to one of said chambers to cause a pressure differential across said bearing means, said bearing means having a series of circumferentially spaced fluid confining pockets adjacent said shaft, said bearing means defining intakes for connecting said pockets to said chamber under the higher pressure, said bearing means cooperating with said shaft to form an exit for connecting said pockets to said chamber under the lower pressure, the cross sectional area of each of said intakes being determined by the formula—

$$A_i = A_e C_e / N R C_i$$

in which $A_i$ = cross sectional area of each intake,
$A_e$ = cross sectional area of the exit,
$C_i$ = orifice coefficient of the intake,
$C_e$ = orifice coefficient of the exit,
$R$ = .3 to 8, and
$N$ = number of intakes, a nonrotatable element surrounding said shaft and positioned in said chamber under the higher pressure between said impeller and said bearing, said element cooperating with said shaft to provide particle screening means, said particle screening means providing a fluid clearance having a radial width less than the smallest dimension of said intakes and a cross sectional area greater than the sum of said cross sectional areas of said intakes, whereby foreign particles in the fluid larger than said intakes are screened from the fluid as it passes into said bearing through said clearance and foreign particles arrested in said clearance are reduced to a size freely passable through said intakes to effect a continuous self-cleaning of said screening means.

11. A self-lubricating centrifugal pump comprising in combination, a fluid confining casing, a partition in said casing for providing in said casing two adjacent fluid confining chambers, said partition defining a passageway between said chambers, a fluid bearing means mounted in said passageway, a shaft rotatably mounted in said bearing means, impeller means mounted on said shaft to impart a pressure to the fluid supplied to one of said chambers to cause a pressure differential across said bearing means, said bearing means defining intakes for admitting fluid into said bearing means from said chamber under the higher pressure, said bearing means cooperating with said shaft to form an exit for conducting fluid out of said bearing means into said chamber under the lower pressure, the cross sectional area of said intakes being determined by the formula—

$$A_i = A_e C_e / N R C_i$$

in which $A_i$ = cross sectional area of each intake,
$A_e$ = cross sectional area of the exit,
$C_i$ = orifice coefficient of the intake,
$C_e$ = orifice coefficient of the exit,
$R$ = .3 to 8, and
$N$ = number of intakes, a nonrotatable annular disk surruonding said shaft and positioned in said chamber under the higher pressure between the source of the fluid and said bearing, said disk cooperating with said shaft to provide a particle screening means, said particle screening means providing a fluid clearance having a radial width less than the smallest dimension of said intakes and a cross sectional area greater than the sum of said cross sectional areas of said intakes, whereby foreign particles in the fluid larger than said intakes are screened from the fluid as it passes from said source into said bearing through said clearance and foreign particles arrested in said clearance are reduced to a size freely passable through said intakes to effect a continuous self-cleaning of said screening means.

12. A self-lubricating centrifugal pump comprising in combination, a fluid confining casing, a partition in said casing for providing in said casing two adjacent fluid confining chambers, said partition defining a passageway between said chambers, fluid bearing means mounted in said passageway, a shaft rotatably mounted in said bearing means, said shaft including a ring having a T-shaped section mounted on and rotatable with said shaft, impeller means mounted on said shaft and positioned in one of said chambers to impart a pressure to the fluid supplied to said one of said chambers to cause a pressure differential across said bearing means, said bearing means having a series of labyrinths adjacent said ring and disposed at the extremities of said bearing means, said bearing means having a series of circumferentially spaced fluid confining pockets adjacent said shaft and positioned intermediate said labyrinths, channels disposed in said bearing means for connecting said pockets to the adjacent said chamber under the higher pressure, orifice means having intakes facing said chamber under the higher pressure disposed in said channels for limiting the flow of fluid through said bearing means, said bearing means cooperating with said shaft to form an exit for connecting said pockets to the adjacent said chamber under the lower pressure, the cross sectional area of each of said intakes being determined by the formula—

$$A_i = A_e C_e / N R C_i$$

in which $A_i$ = cross sectional area of each intake,
$A_e$ = cross sectional area of the exit,
$C_i$ = orifice coefficient of the intake,
$C_e$ = orifice coefficient of the exit,
$R$ = .3 to 8, and
$N$ = number of intakes, a nonrotatable annular disk surrounding said shaft and positioned in said chamber under the higher pressure between said impeller and said bearing, the outer periphery of said disk forming a fluid tight seal with said bearing means between said intakes and said impeller, the inner periphery of said disk cooperating with said ring to provide a particle screening means, said particle screening means providing a fluid clearance having a radial width less than the smallest dimension of said intakes and a cross sectional area greater than the sum of said cross sectional areas of said intakes, whereby foreign particles in the fluid larger than said intakes are screened from the fluid as it passes into said bearing through said clearance and foreign particles arrested in said clearance are reduced to a size freely passable through said intakes to effect a continuous self-cleaning of said screening means.

References Cited in the file of this patent

UNITED STATES PATENTS 2,668,501   Lutz _____ Feb. 9, 1954